(12) United States Patent
Wakabayashi et al.

(10) Patent No.: US 6,879,756 B2
(45) Date of Patent: Apr. 12, 2005

(54) OPTICAL DELAY LINE AND MANUFACTURING METHOD THEREFOR

(75) Inventors: Shinichi Wakabayashi, Sagamihara (JP); Hitomi Moriya, Kawasaki (JP); Yoshinori Takeuchi, Tokyo (JP); Asako Baba, Tokyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 133 days.

(21) Appl. No.: 10/365,485

(22) Filed: Feb. 13, 2003

(65) Prior Publication Data

US 2003/0152323 A1 Aug. 14, 2003

(30) Foreign Application Priority Data

Feb. 13, 2002 (JP) .................................... P2002-035273

(51) Int. Cl.[7] ............................. G02B 6/34; G02B 6/00; G02B 5/18
(52) U.S. Cl. ............................. 385/37; 385/27; 385/42; 65/408
(58) Field of Search ............................. 385/14, 15, 27, 385/31, 32, 37, 39, 42, 50; 65/408–411

(56) References Cited

U.S. PATENT DOCUMENTS

| 4,737,007 A | 4/1988 | Alferness et al. |
| 4,890,893 A | 1/1990 | Smoot |
| 5,574,807 A | 11/1996 | Snitzer |
| 5,737,108 A | 4/1998 | Bunch et al. |
| 6,011,881 A | * 1/2000 | Moslehi et al. ............... 385/10 |

FOREIGN PATENT DOCUMENTS

WO   WO 95/14946   1/1995

* cited by examiner

*Primary Examiner*—Akm Enayet Ullah
*Assistant Examiner*—Kevin S. Wood
(74) *Attorney, Agent, or Firm*—Browdy and Neimark, P.L.L.C.

(57) ABSTRACT

An optical delay line of a configuration in which a number of components such as a circulator and an optical coupler is reduced is to be provided. To this end, the optical delay line has a configuration in which, after an optical fiber diffraction grating having a core subjected to refractive index modulation and a cladding partly cleared of its outer circumference and an optical fiber having a cladding partly cleared of its outer circumference are brought close to each other so that the cores have mutually parallel directions of an optical axis to fabricate a directional coupler, both ends of the optical fiber are connected into an optical fiber loop. In this way, an optical delay line to generate a specific time delay for controlling optical signals can be provided in small dimensions and with a small number of components.

5 Claims, 8 Drawing Sheets

Fig. 2
(a)
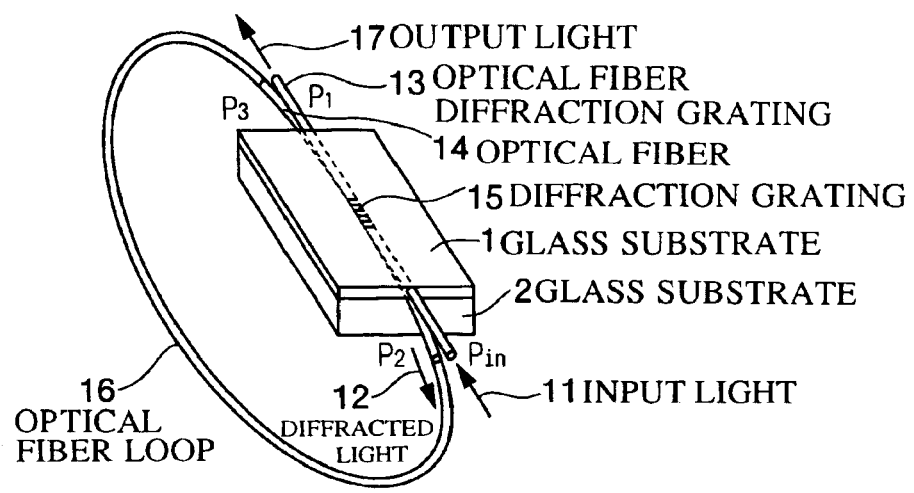
(b)
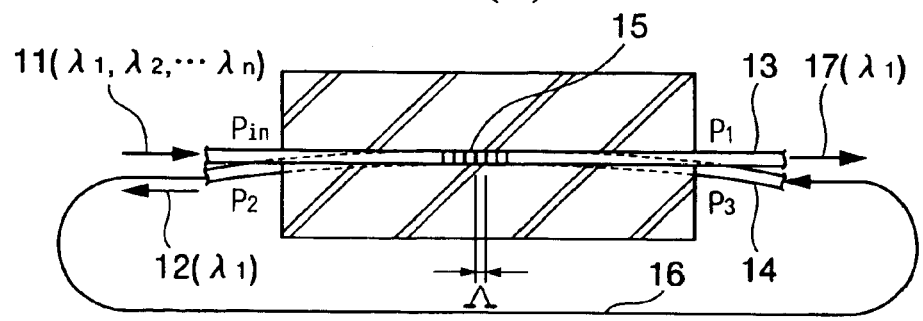
(c)
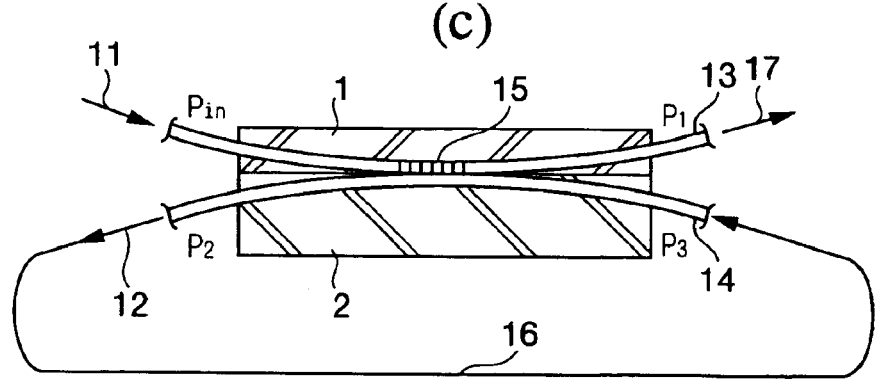

Fig. 6
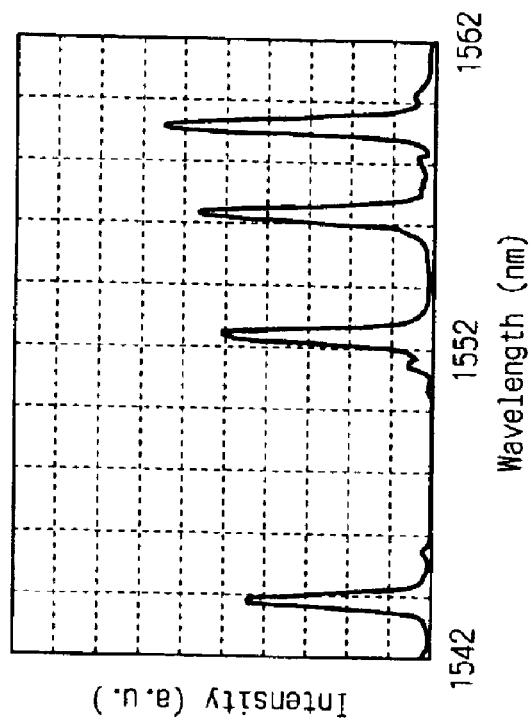
(a) INPUT LIGHT SPECTRUM
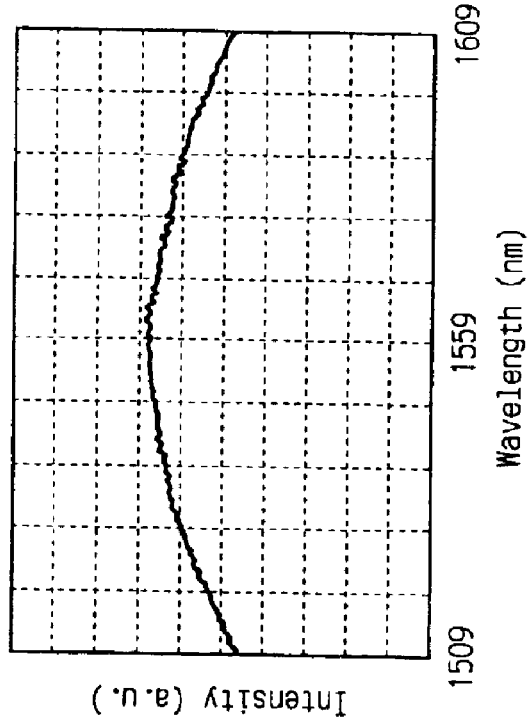
(b) OUTPUTTED LIGHT SPECTRUM

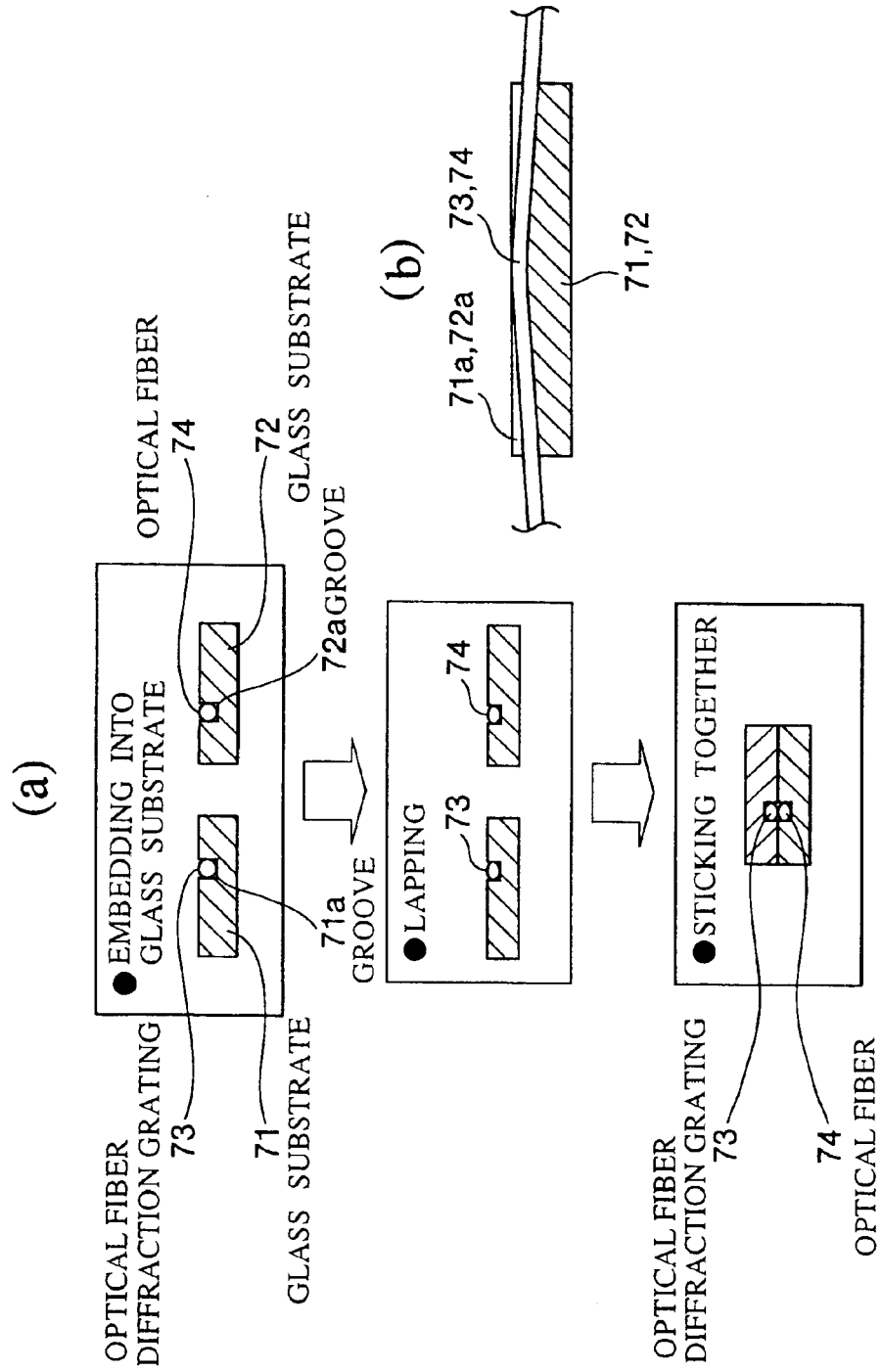

OPTICAL DELAY LINE AND MANUFACTURING METHOD THEREFOR

BACKGROUND OF THE INVENTION

1. Field of the Invention

The present invention relates to an optical delay line, which is an optical control element for use in optical fiber communication, and a manufacturing method therefor.

2. Description of the Prior Art

Nowadays, a higher speed is sought after in optical fiber communication, not only on trunk lines but also on optical subscriber lines, and studies are made on capacity expansion by use of ultra-short pulses and photonic networks performing no photoelectric conversion at repeaters. Especially at each repeater (node) of such an optical communication system, an optical delay line to generate a specific time delay for controlling optical signals is required, and an optical control device for that purpose constitutes one of the key devices. Whereas a specific way of generating an optical delay is usually to have the light pass an optical fiber loop or the like having a specific distance, the method of matching with a specific wavelength is to distinguish the wavelength with a filter and to connect it to the optical fiber loop with a coupler or the like.

On the other hand, an optical fiber diffraction grating (fiber grating) in the core of the optical fiber has a narrow band filter characteristic, and excels in stability and in the efficiency of the use of light. However, since the optical fiber diffraction grating uses a reflected spectrum, it is difficult to be made a transmission type element, and therefore has to be used in combination with an optical circulator. This makes it difficult to realize the element at a low cost.

Waveguide couplers having a configuration of using no optical circulator includes one disclosed in the Published Japanese Translation of Unexamined PCT Application No. Hei 9-505673. Its elemental configuration is shown in FIG. 1, in which reference numerals 10 and 20 denote optical fibers; 30, an input end; 40 and 50, glass blocks to which the optical fibers 10 and 20 are respectively fixed; 25, a diffraction grating arranged in the core of an optical fiber; and 45, a coupling region having a length Lc of the two fibers 10 and 20 exposed from the surfaces of the glass blocks 40 and 50.

The optical fiber 10 and the optical fiber 20 constitute a directional coupler in which the cores of the two fibers are arranged close to each other. The coupling length Lc is so set that lights of a plurality of wavelengths coming incident from the input end 30 all transfer from the optical fiber 10 to the optical fiber 20. However, the light of a Bragg wavelength ($\lambda 1 = \lambda B$) from the diffraction grating 25 cannot transfer to the optical fiber 20, and is outputted as T1. Therefore, lights of other wavelengths ($\lambda 2, \lambda 3 \ldots$) than the Bragg wavelength are outputted as T2.

The waveguide coupler of the configuration described above, though able to manifest a wavelength filtering function, cannot function as an optical delay line for a specific wavelength. It involves a further problem that, though it can constitute a delay line for a specific wavelength when combined with an optical fiber loop, an optical circulator and an optical coupler would be required separately. Still another problem is that, in order to form a directional coupler after the formation of an optical fiber diffraction grating, precise and uniform machining of a large area of cladding giving rise to no thermal process is needed, but there is scarcely a practical means to meet this need.

An object of the present invention, intended to solve the problems of the prior art noted above, is to provide an optical delay line for generating a specific time delay for controlling optical signals and a manufacturing method therefor.

SUMMARY OF THE INVENTION

An essence of an optical delay line according to the present invention is that it is provided with a directional coupler wherein a first waveguide consisting of an optical fiber diffraction grating having a core subjected to refractive index modulation and a cladding partly cleared of its outer circumference and a second waveguide consisting of an optical fiber having a cladding partly cleared of its outer circumference are brought close to each other to cause the cores to have mutually parallel directions of an optical axis, and with means for optically connecting both ends of the second waveguide.

The invention can provide, in small dimensions and with a small number of components, an optical delay line to generate a specific time delay for controlling optical signals.

Another essence of an optical delay line according to the invention is that, in the aforementioned optical delay line, the first waveguide has a plurality of diffraction gratings differing in refractive index modulation pitch. This configuration makes possible simultaneous delaying of lights having a plurality of different wavelengths.

Another essence of an optical delay line according to the invention is that, in the aforementioned optical delay line, the first waveguide have two diffraction gratings of the same refractive index modulation pitch. As this configuration makes it possible to accurately control the position in which the diffraction gratings are formed in the optical fibers, an optical delay line capable of generating any desired extent of delay can be provided.

Another essence of an optical delay line according to the invention is that, in the aforementioned optical delay line, the first waveguide has a plurality of pairs of diffraction gratings of the same refractive index modulation pitch. This configuration makes it possible to provide an optical delay line capable of generating any desired extent of delay for each of a plurality of lights of different wavelengths.

An essence of a method for manufacturing an optical delay line according to the invention is that it comprises a step of embedding an optical fiber diffraction grating and an optical fiber respectively into grooves formed in surfaces of two glass substrates; a step of removing part of claddings of the optical fiber diffraction grating and of the optical fiber by lapping the surfaces of the glass substrates; a step of forming a directional coupler by sticking together the surfaces of the glass substrates in a state in which the optical fiber diffraction grating and the optical fiber are brought into contact with each other; and a step of connecting both ends of the optical fiber. This method for manufacturing an optical delay line can provide the advantages of giving rise to no thermal process and making it possible to machine a large area of cladding accurately and uniformly.

Therefore, an object of the present invention is to provide an optical delay line for generating a specific time delay for controlling optical signals and a manufacturing method therefor.

The object and the advantages of the invention will become more apparent from the embodiments thereof to be described below with reference to the accompanying drawings.

BRIEF DESCRIPTION OF THE DRAWINGS

FIG. 2:

(a) A schematic perspective view of the configuration of an optical delay line in Embodiment 1 of the invention;

(b) A schematic plan of the optical delay line in Embodiment 1 of the invention; and (c) A schematic sectional profile of the optical delay line in Embodiment 1 of the invention.

Figure 1:
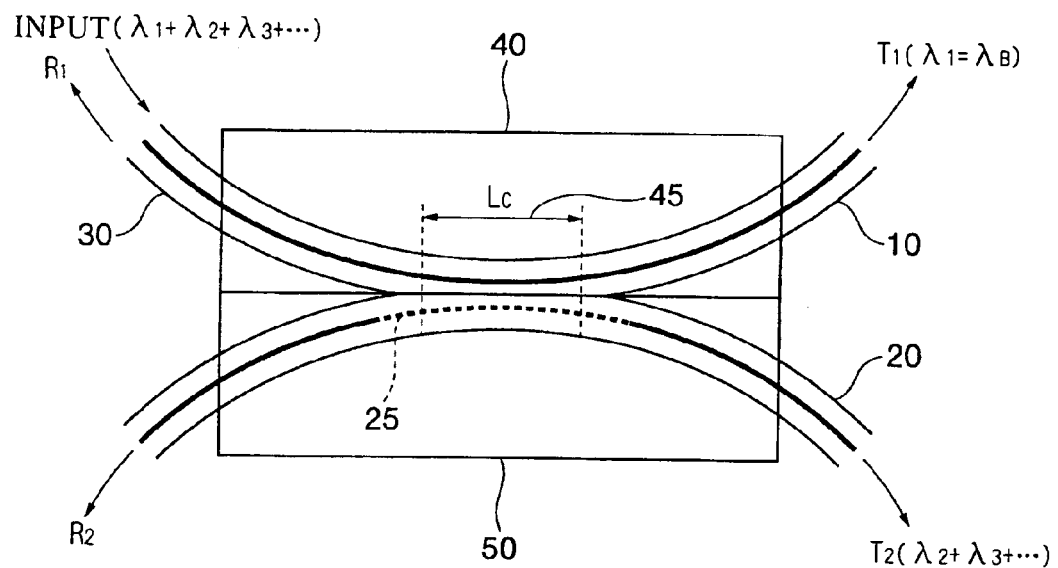
FIG. 1 schematically shows a section of a waveguide coupler in an embodiment of the prior art.
Figure 3:
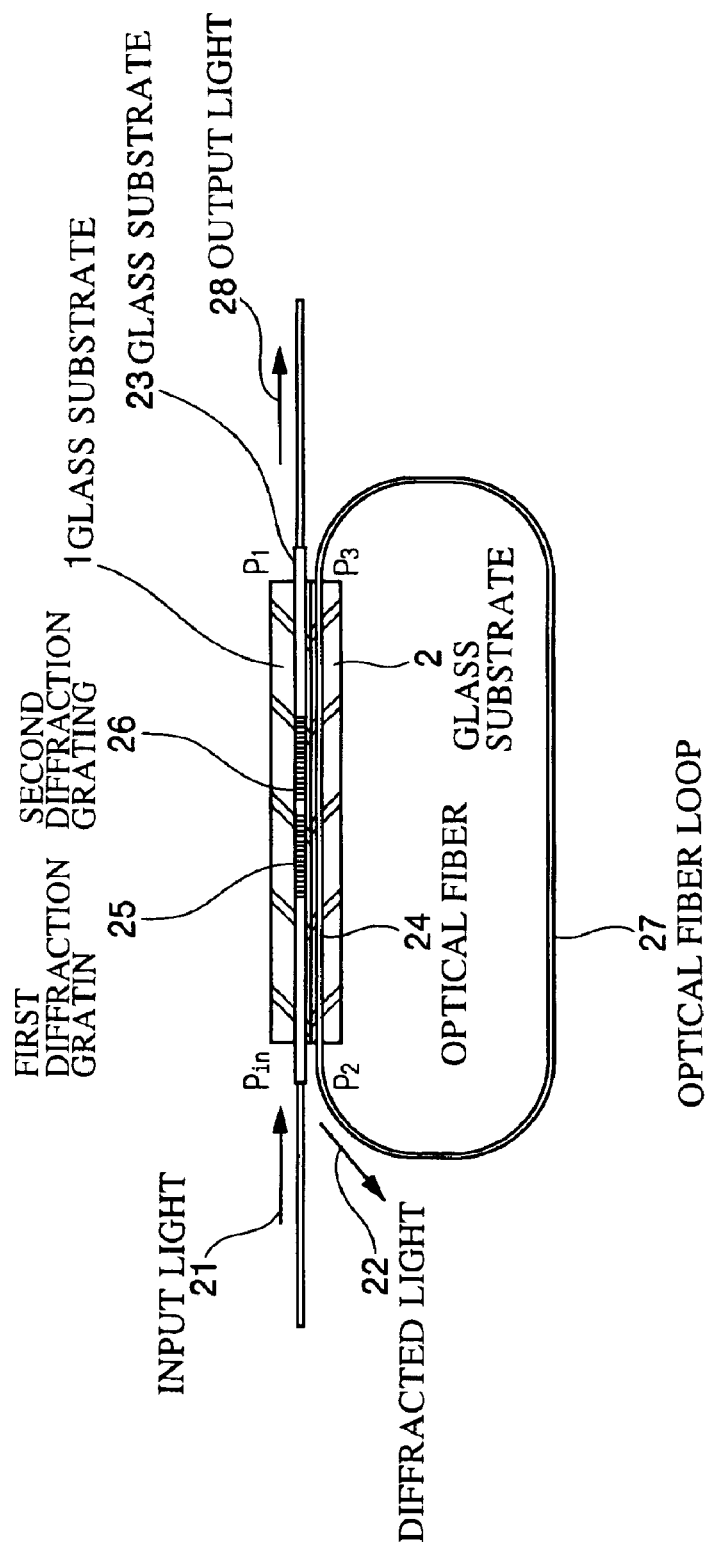

FIG. 3 schematically shows a section of an optical delay line having two diffraction gratings differing in refractive index modulation pitch in Embodiment 2 of the invention.

FIG. 4:

(a) A spectral diagram of the input light in Embodiment 2 of the invention; and (b) A spectral diagram of the diffracted light in Embodiment 2 of the invention.

Figure 5:
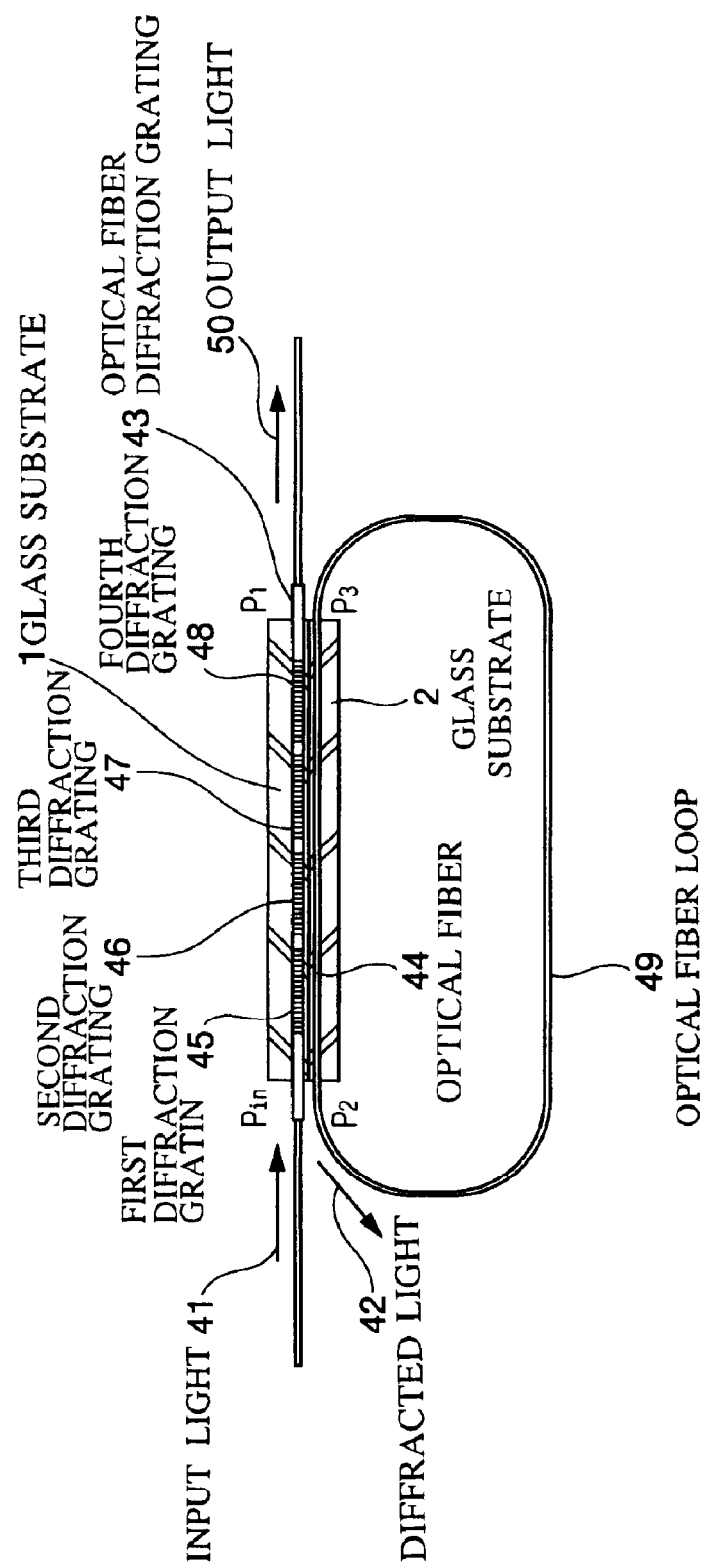

FIG. 5 schematically shows a section of an optical delay line having four diffraction gratings differing in refractive index modulation pitch in Embodiment 3 of the invention.

FIG. 6:

(a) A spectral diagram of the input light in Embodiment 3 of the invention; and (b) A spectral diagram of the diffracted light in Embodiment 3 of the invention.

Figure 7:
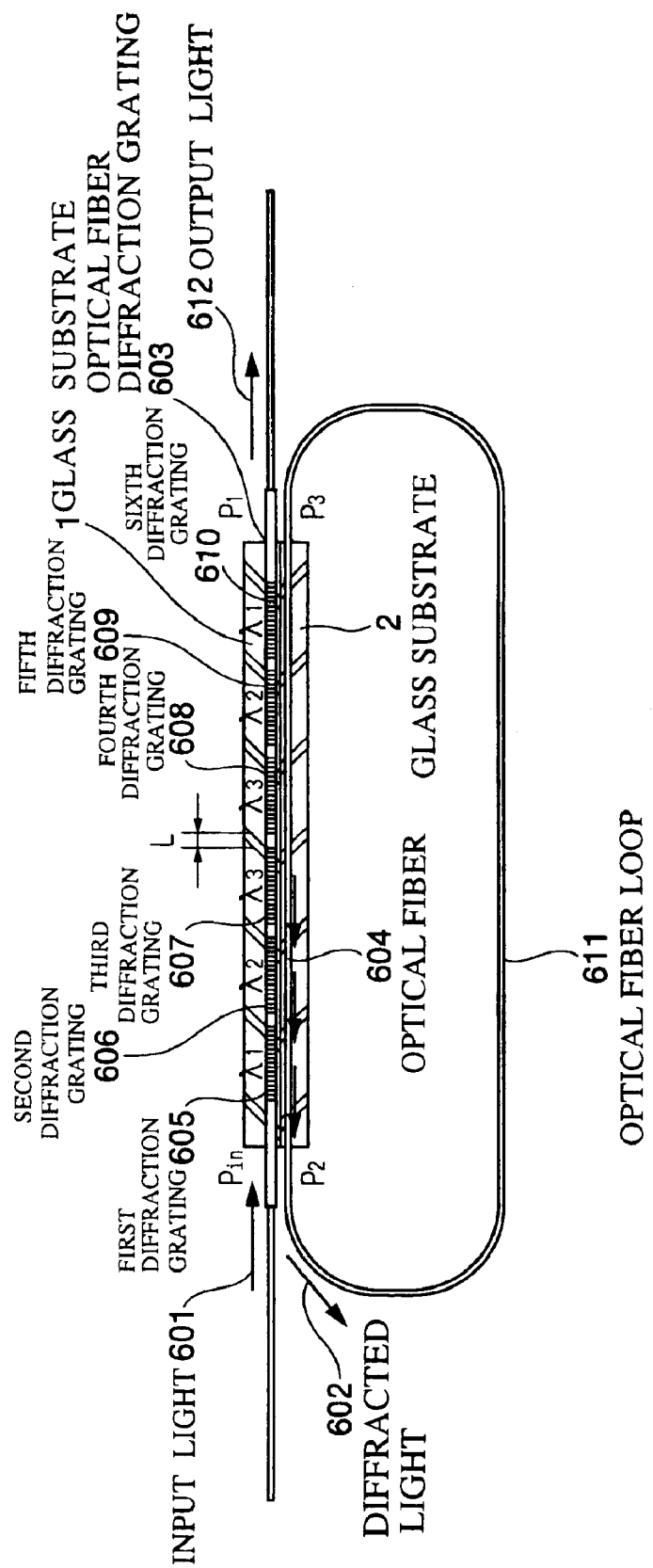

FIG. 7 schematically shows a section of an optical delay line having three pairs of two diffraction gratings of the same refractive index modulation pitch in Embodiment 4 of the invention.

FIG. 8:

(a) A schematic process diagram of fabricating a directional coupler in Embodiment 5 of the invention.

(b) A section in the lengthwise direction of another example of directional coupler fabricating process.

DESCRIPTION OF THE PREFERRED EMBODIMENTS (Embodiment 1)

Preferred embodiments of the present invention will be described below with reference to accompanying drawings. FIG. 2 schematically shows the configuration of an optical delay line in Embodiment 1 of the invention, in which FIG. 2(a) is an overall perspective view of the optical delay line; FIG. 2(b), a plan of its directional coupler portion; and FIG. 2(c), a profile of its directional coupler portion. Reference numerals 1 and 2 denote glass substrates; 11 denotes an input light; 12 denotes an diffracted light; 13 denotes an optical fiber diffraction grating; 14 denotes an optical fiber; 15 denotes a diffraction grating formed in the optical fiber diffraction grating 13; 16 denotes an optical fiber loop for giving a delay; and 17 denotes an output light.

The operation of the optical delay line configured as described above will now be described. The input light 11 having a plurality of wavelength components ($\lambda 1, \lambda 2, \ldots \lambda n$) is brought to incidence on the optical fiber diffraction grating 13 from an input port Pin. The optical fiber diffraction grating 13 and the optical fiber 14 are cleared of the cladding on their respective fiber flanks, and their cores are brought close to each other to form a directional coupler. The propagation constants of the optical fiber diffraction grating 13 and the optical fiber 14 are represented by $\beta 1$ and $\beta 2$, and $\beta 1$ and $\beta 2$ are supposed to be unequal. When the diffraction grating 15 is subjected to refractive index modulation at a pitch $\Lambda$ and a magnitude $\Delta n$ and the distance between the cores is set to a few $\mu m$ to tens of $\mu m$, out of the input light 11, a wavelength component satisfying the phase matching condition of:

$$\beta 1(\lambda) - \beta 2(\lambda) = 2\pi/\Lambda \tag{1}$$

is supplied as the diffracted light 12. Whereas the intensity of the diffracted light is determined by such factors as the propagation constant, inter-core distance, coupling length and refractive index modulation magnitude $\Delta n$, it can be brought close to 100%.

Therefore, by forming the diffraction grating 15 of a pitch matching $\lambda 1$ as the Bragg wavelength, a light having a wavelength $\lambda 1$ can be emitted from a port P2 as the diffracted light 12. The diffracted light 12 passes the optical fiber loop 16 and is brought to incidence again on the optical fiber 14 from a port P3; this time, in a reverse sequence to the previous, it is coupled to the optical fiber diffraction grating 13 to be emitted from a port P1 as an output light 17. Thus only the component of the wavelength $\lambda 1$ can be caused to delay behind other wavelength components by the optical path length of the optical fiber loop 16.

In this way, this Embodiment 1 of the invention can realize in small dimensions and with a small number of components an optical delay line to generate a specific time delay for controlling optical signals.

(Embodiment 2)

Figure 4:
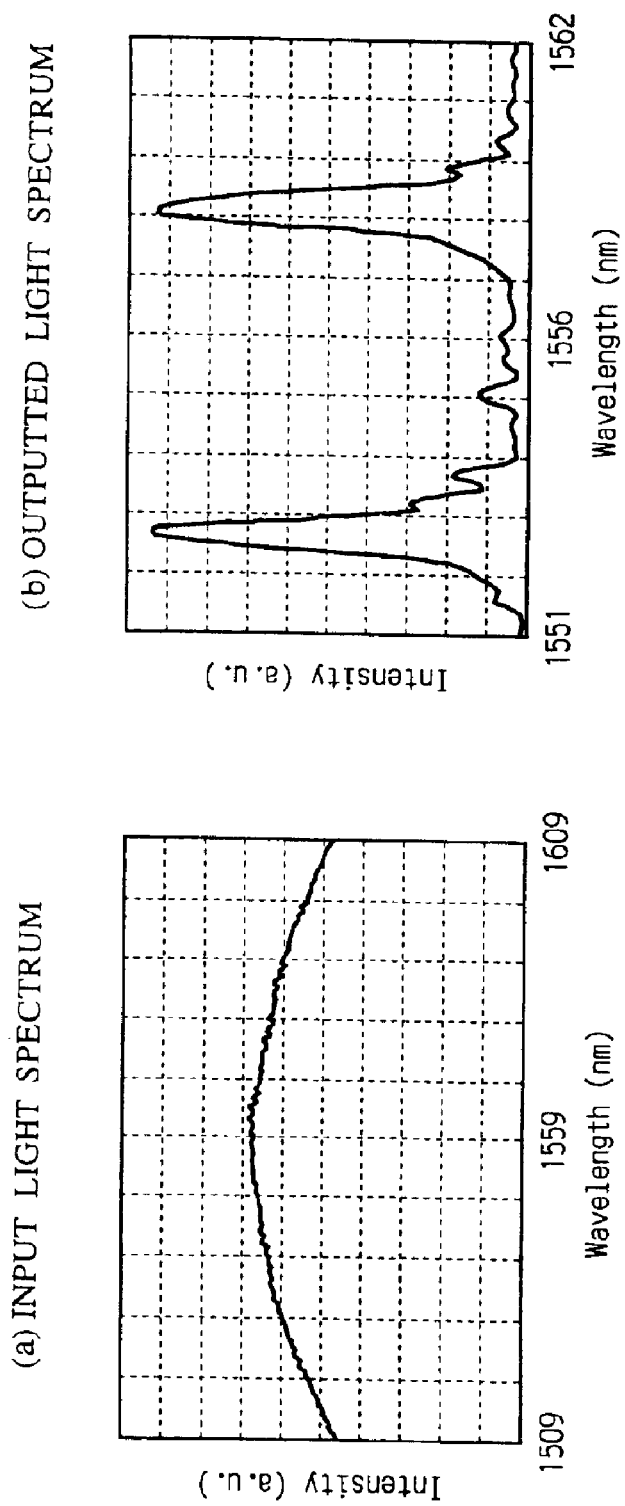

Next will be described Embodiment 2 of the present invention with reference to FIG. 3 and FIG. 4. FIG. 3 schematically shows an overall configuration of an optical delay line having two diffraction gratings differing in refractive index modulation pitch, wherein reference numerals 1 and 2 denote glass substrates; 21 denotes an input light; 22 denotes an diffracted light; 23 denotes an optical fiber diffraction grating; 24 denotes an optical fiber; 25 and 26 denote a first diffraction grating and a second diffraction grating, respectively, formed in the optical fiber diffraction grating 23; 27 denotes an optical fiber loop for generating a delay; and 28 denotes an output light. FIG. 4(a) shows the spectrum of the input light 21 in a case where an actually fabricated element is used, and FIG. 4(b), the spectrum of the diffracted light 22. A super-luminescent diode is used as the source of the input light 21, having a wideband spectral characteristic of 100 nm or more. The two kinds of diffraction gratings which were fabricated had pitches $\Lambda$ of 536.4 nm and 538.5 nm, respectively matching wavelengths of 1552 nm and 1558 nm.

The input light 21 is brought to incidence on the optical fiber diffraction grating 23 from the input port Pin. The optical fiber diffraction grating 23 and the optical fiber 24 are cleared of the cladding on their respective fiber flanks, and their cores are brought close to each other to form a directional coupler. Therefore, by forming the diffraction gratings 25 and 26 of pitches having a Bragg wavelength matching the wavelength of the input light 21, lights having a plurality of matching wavelengths can be emitted from the port P2 as the diffracted light 22. The diffracted light 22 passes the optical fiber loop 27 and is brought to incidence again on the optical fiber 24 from the port P3; this time, in a reverse sequence to the previous, it is coupled to the optical fiber diffraction grating 23 in the parts of the diffraction gratings 26 and 25 of the respectively matching pitches to be emitted from the port P1 as an output light 28. Thus the lights having a plurality of wavelengths passing the optical fiber loop 27 generate a delay by the optical path length of the optical fiber loop 27.

In this way, this Embodiment 2 of the invention can realize in small dimensions and with a small number of components an optical delay line matching lights having a plurality of wavelengths to generate a specific time delay for controlling optical signals.

(Embodiment 3)

Next will be described Embodiment 3 of the present invention with reference to FIG. 5 and FIG. 6. FIG. 5 schematically shows an overall configuration of an optical delay line having four diffraction gratings differing in refractive index modulation pitch, wherein reference numerals 1 and 2 denote glass substrates; 41 denotes an input light; 42 denotes an diffracted light; 43 denotes an optical fiber diffraction grating; 44 denotes an optical fiber; 45, 46, 47 and 48 denote a first diffraction grating, a second diffraction grating, a third diffraction grating and a fourth diffraction grating, respectively, formed in the optical fiber diffraction grating 43; 49 denotes an optical fiber loop for generating a delay; and 50 denotes an output light. FIG. 6(a) shows the spectrum of the input light 41 in a case where an actually fabricated element is used, and FIG. 6(b), the spectrum of the diffracted light 42. A super-luminescent diode is used as the source of the input light 41. The four kinds of diffraction gratings which were fabricated had pitches A of 533.4 nm, 536.4 nm, 537.7 nm and 538.5 nm, respectively matching wavelengths of 1544 nm, 1552 nm, 1558 nm and 1560 nm.

The input light 41 is brought to incidence on the optical fiber diffraction grating 43 from the input port Pin. The optical fiber diffraction grating 43 and the optical fiber 44 are cleared of the cladding on their respective fiber flanks, and their cores are brought close to each other to form a directional coupler. Therefore, by forming the diffraction gratings 45, 46, 47 and 48 of pitches having a Bragg wavelength matching the wavelength of the input light 41, lights having a plurality of matching wavelengths can be emitted from the port P2 as the diffracted light 42. The diffracted light 42 passes the optical fiber loop 49 and is brought to incidence again on the optical fiber 44 from the port P3; this time, in a reverse sequence to the previous, it is coupled to the optical fiber diffraction grating 43 in the parts of the diffraction gratings 48, 47, 46 and 45 of the respectively matching pitches to be emitted from the port P1 as an output light 50. Thus the lights having a plurality of wavelengths passing the optical fiber loop 49 generate a delay by the optical path length of the optical fiber loop 49.

In this way, this Embodiment 3 of the invention can realize in small dimensions and with a small number of components an optical delay line matching lights having a plurality of wavelengths to generate a specific time delay for controlling optical signals.

(Embodiment 4)

Next will be described Embodiment 4 of the present invention with reference to FIG. 7. FIG. 7 schematically shows an overall configuration of an optical delay line having three pairs of two diffraction gratings of the same refractive index modulation pitch, in which the extent of delay for each wavelength can be adjusted as desired according the positions of those diffraction gratings. In FIG. 7, reference numerals 1 and 2 denote glass substrates; 601 denotes an input light; 602 denotes an diffracted light; 603 denotes an optical fiber diffraction grating; 604 denotes an optical fiber; 605, 606, 607, 608, 609 and 610 denote respectively a first diffraction grating, a second diffraction grating, a third diffraction grating, a fourth diffraction grating, a fifth diffraction grating and a sixth diffraction grating formed in the optical fiber diffraction grating 603; 611 denotes, an optical fiber loop for generating a delay; and 612 denotes an output light. The first diffraction grating 605 and the sixth diffraction grating 610 have the same pitch matching a Bragg wavelength λ1; similarly, the second diffraction grating 606 and the fifth diffraction grating 609 have the same pitch matching a Bragg wavelength λ2, and the third diffraction grating 607 and the fourth diffraction grating 608 have the same pitch matching a Bragg wavelength λ3.

The input light 601 having a plurality of wavelength components (λ1, λ2, . . . λn) is brought to incidence on the optical fiber diffraction grating 603 from the input port Pin. The optical fiber diffraction grating 603 and the optical fiber 604 are cleared of the cladding on their respective fiber flanks, and their cores are brought close to each other to form a directional coupler. Therefore, in the first diffraction grating 605 part of the pitch matching λ1 as the Bragg wavelength a light of the wavelength λ1 is emitted from the port P2 of the optical fiber 604 as the diffracted light 602. The diffracted light 602 passes the optical fiber loop 611, and is again brought to incidence on the optical fiber 604 from the port P3. As the sixth diffraction grating 610 is formed in the vicinity of the port P3, the light of the wavelength λ1 is coupled to the optical fiber diffraction grating 603 in this part and emitted from the port P1 as the output light 612. Similarly, in the second diffraction grating 606 part of the pitch matching λ2 as the Bragg wavelength, a light of the wavelength λ2 is emitted from the port P2 as the diffracted light 602, passes the optical fiber loop 611, is brought to incidence again on the optical fiber 604 from the port P3, and in the fifth diffraction grating 609 part a light of the wavelength λ2 is coupled to the optical fiber diffraction grating 603 to be emitted from the Port P1 as the output light. 612. Similarly, in the third diffraction grating 607 part of the pitch matching λ3 as the Bragg wavelength a light of the wavelength λ3 is emitted from the port P2 as the diffracted light 602, passes the optical fiber loop 611, is brought to incidence again on the optical fiber 604 from the port P3, and in the fourth diffraction grating 608 part, a light of the wavelength λ3 is coupled to the optical fiber diffraction grating 603 to be emitted from the port P1 as the output light 612.

In this way, to consider the optical path lengths of λ1, λ2 and λ3, the light of each wavelength travels between the optical fiber diffraction grating 603 and the optical fiber 604 at two different points, and though all of the three lights pass the same optical fiber loop 611, there arise twice as great a difference in optical path length as the interval between the diffraction grating positions. Thus, the positional interval between consecutive diffraction gratings being represented by L as illustrated, the optical path length difference between λ1 and λ2 is 2L, and similarly the difference between λ2 and λ3 also is 2L. Accordingly, even if only one optical fiber loop 611 is used, a slight delay difference can be generated for each wavelength by positional adjustment of diffraction gratings.

In this way, this Embodiment 4 of the invention can realize in small dimensions and with a small number of components an optical delay line to generate any desired extent of delay for lights having a plurality of different wavelengths.

To add, it is evident that diverse optical delay lines in Embodiments 1, 2, 3 and 4 described above can be realized by appropriately setting the number of diffraction gratings and delay differences (diffraction grating intervals L), the length of the optical fiber loop and those of the optical fibers constituting the directional coupler, and the method of connecting the output ports and the optical fiber loop among other factors.

(Embodiment 5)

Next will be described Embodiment 5 of the present invention with reference to FIG. 8. FIG. 8(a) is a schematic diagram of a process of fabricating a directional coupler by bringing the cores of optical fibers close to each other, wherein reference numerals 71 and 72 denote glass substrates having the same surface areas and optical characteristics; 71a and 72a, grooves of the same size formed in the same positions in the glass substrate 71 and 72; 73, an optical fiber diffraction grating; and 74, an optical fiber.

First the grooves 71a and 72a of substantially the same depth as the diameter of each fiber for embedding the optical fiber diffraction grating 73 and the optical fiber 74 are formed in the glass substrates 71 and 72, respectively; the optical fiber diffraction grating 73 and the optical fiber 74 are embedded into the grooves 71a and 72a, respectively, and fixed with an adhesive or the like. Then, the surfaces of the glass substrates 71 and 72 are lapped to remove part of the cladding on the flanks of the optical fiber diffraction grating 73 and the optical fiber 74. The apparatus used for the lapping may be an apparatus usually applied to semiconductor substrate lapping, with which a large area can be lapped accurately and uniformly in a relatively short period of time. Finally, the directional coupler is formed by sticking together the lapped surfaces of the glass substrates 71 and 72 with the cladding-cleared portions of the optical fiber diffraction grating 73 and 74 kept in contact with each other. Further by fusing together both ends of the optical fiber 74 with separately prepared other optical fibers, the optical fiber loop is formed.

Whereas as much of the cladding of the optical fiber grating 73 and the optical fiber 74 as the width of the glass substrates 71 and 72 is removed by the method above, if it is desired to partly remove the cladding of the optical fiber grating 73 and the optical fiber 74, the cladding only in the central part can be removed by, for instance as shown in FIG. 8(b), forming the grooves 71a and 72a in the glass substrates 71 and 72, respectively, in increasing gradually depths from the central part towards each end to cause the parts of the optical fiber grating 73 and the optical fiber 74 to be cleared of the cladding, because in this way only the central parts of the optical fibers 73 and 74 are lapped when the surfaces of the glass substrates 71 and 72 are lapped.

Thus this Embodiment 5 can provide a method for manufacturing an optical delay line having the advantages of giving rise to no thermal process and making it possible to machine a large area accurately and uniformly.

To add, regarding the glass substrate size and the characteristics of the directional coupler including the region to be cleared of cladding in this Embodiment 5, the fabricating conditions can be appropriately set and put into practice to realize a diversity of optical delay lines.

Although the present invention has been described with reference to preferred embodiments thereof illustrated in the accompanying drawings, it is evident that persons skilled in the art can readily vary or modify these embodiments without deviating from the true spirit and scope of the invention. The invention includes such variations and modifications.

What is claimed is:

1. An optical delay line provided with a directional coupler herein a first waveguide consisting of an optical fiber diffraction grating having a core subjected to refractive index modulation and a cladding partly cleared of its outer circumference and a second waveguide consisting of an optical fiber having a cladding partly cleared of its outer circumference are brought close to each other to cause said core and another core to have mutually parallel directions of an optical axis, and with means for optically connecting both ends of said second waveguide.

2. The optical delay line according to claim 1, wherein said first waveguide has a plurality of diffraction gratings differing in refractive index modulation pitch.

3. The optical delay line according to claim 1, wherein said first waveguide has two diffraction gratings of the same refractive index modulation pitch.

4. The optical delay line according to claim 1, wherein aid first waveguide has a plurality of pairs of diffraction gratings of the same refractive index modulation pitch.

5. A method for manufacturing an optical delay line comprising:

a step of embedding an optical fiber diffraction grating and an optical fiber respectively into grooves formed in the surfaces of two glass substrates;

a step of removing part of claddings of said optical fiber diffraction grating and of said optical fiber by lapping the surfaces of said glass substrates;

a step of forming a directional coupler by sticking together the surfaces of said glass substrates in a state in which said optical fiber diffraction grating and said optical fiber are brought into contact with each other; and a step of connecting both ends of said optical fiber.

* * * * *